US011296645B2

(12) United States Patent
Abbasi et al.

(10) Patent No.: US 11,296,645 B2
(45) Date of Patent: Apr. 5, 2022

(54) SOLAR-INFRARED HYBRID COLLECTOR

(71) Applicants: Hamid Ali Abbasi, Naperville, IL (US); David F. Cygan, Villa Park, IL (US)

(72) Inventors: Hamid Ali Abbasi, Naperville, IL (US); David F. Cygan, Villa Park, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 591 days.

(21) Appl. No.: 14/724,930

(22) Filed: May 29, 2015

(65) Prior Publication Data

US 2015/0349698 A1    Dec. 3, 2015

Related U.S. Application Data

(60) Provisional application No. 62/004,627, filed on May 29, 2014.

(51) Int. Cl.
*H02S 10/30* (2014.01)
*H02S 40/44* (2014.01)
*H02S 40/22* (2014.01)

(52) U.S. Cl.
CPC .............. *H02S 10/30* (2014.12); *H02S 40/22* (2014.12); *H02S 40/44* (2014.12); *Y02E 10/52* (2013.01); *Y02E 10/60* (2013.01)

(58) Field of Classification Search
CPC .......... H02S 10/30; H02S 40/22; H02S 40/44; Y02E 10/60; Y02E 10/52; H01L 31/0547; F23D 14/18; F23D 91/02; F24J 2/10; F24J 2/07; F24J 2/08
See application file for complete search history.

(56) References Cited

U.S. PATENT DOCUMENTS

| | | | | |
|---|---|---|---|---|
| 4,045,246 A | * | 8/1977 | Mlavsky | F24J 2/10 126/634 |
| 4,427,838 A | * | 1/1984 | Goldman | F24J 2/0015 126/605 |
| 6,372,979 B1 | * | 4/2002 | Streetman | H02S 10/30 136/244 |
| 2007/0137690 A1 | * | 6/2007 | Bruning | H01L 31/0549 136/246 |
| 2008/0084151 A1 | * | 4/2008 | Miller | H01J 61/40 313/110 |
| 2014/0166085 A1 | * | 6/2014 | Ollier | F23D 14/18 136/253 |

FOREIGN PATENT DOCUMENTS

WO    WO 2012/136800 A1 * 10/2012 ............. F23D 14/18

* cited by examiner

*Primary Examiner* — Devina Pillay
(74) *Attorney, Agent, or Firm* — Pauley Erickson & Swanson

(57) ABSTRACT

A system and method for improving solar collector design to provide thermal and electric output during times of low or no solar intensity. The improved solar collector design includes an infrared heater to supplement energy provided by the sun during time of low or no solar intensity.

24 Claims, 6 Drawing Sheets

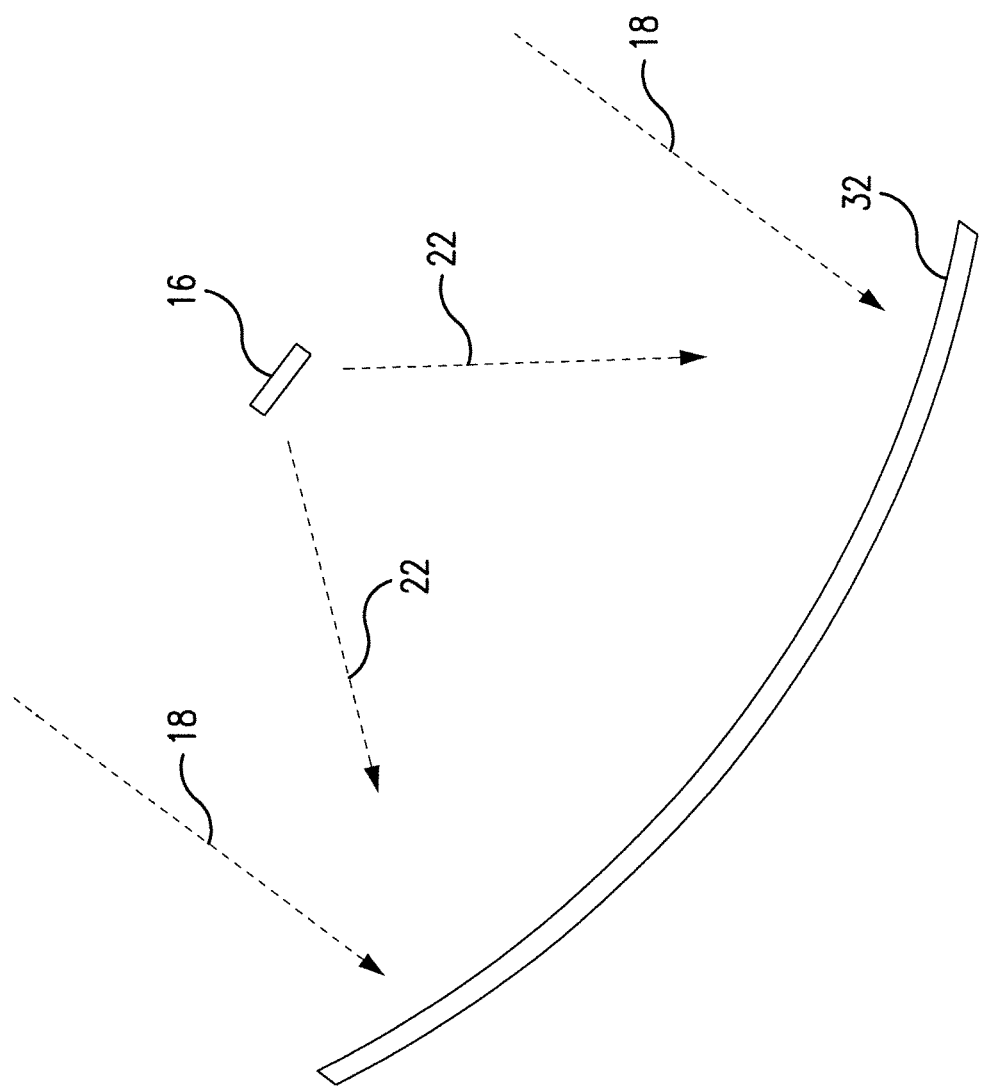

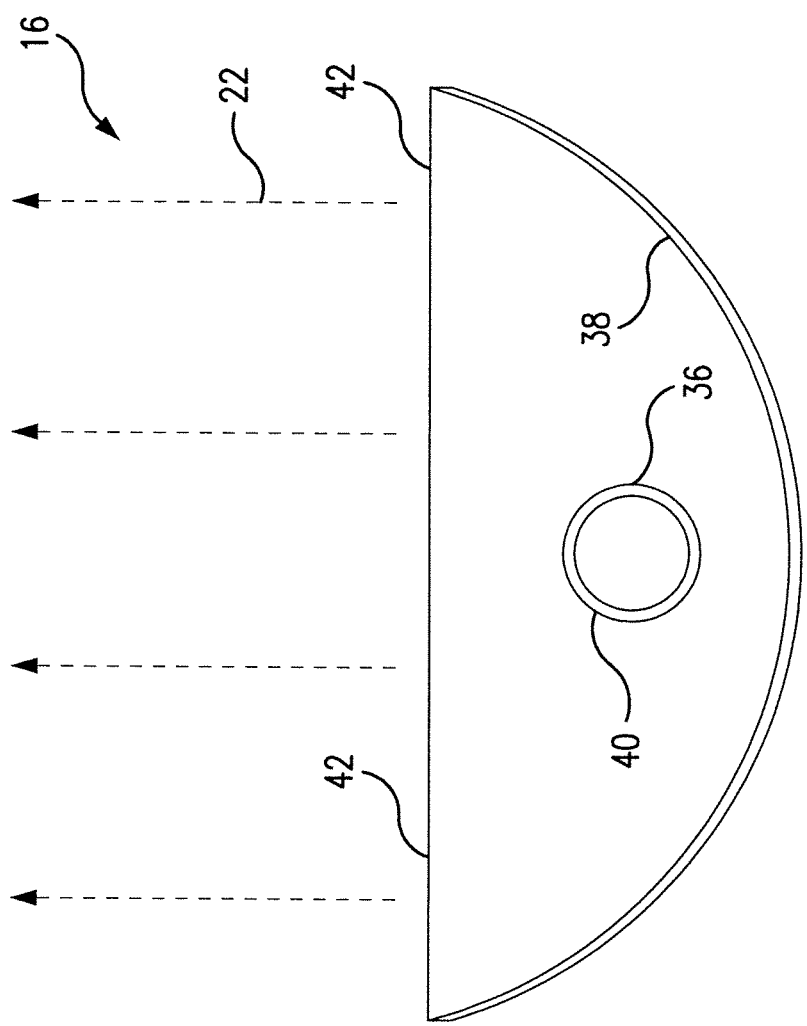

SOLAR-INFRARED HYBRID COLLECTOR

CROSS REFERENCE TO RELATED APPLICATION(S)

This application claims the benefit of U.S. Provisional Patent Application Ser. No. 62/004,627, filed on 29 May 2014. The Provisional Application is hereby incorporated by reference herein in its entirety and is made a part hereof, including but not limited to those portions which specifically appear hereinafter.

BACKGROUND OF THE INVENTION

Field of the Invention

This invention relates to an improved solar collector including an infrared heater to provide electricity and thermal energy during times of high and low solar energy and even in absence of solar radiation.

Discussion of Related Art

Solar energy systems, including solar collectors, generate electricity and thermal energy from the sun. Known systems generally include a curved mirror or a lens to focus sunlight onto a receiver which includes photovoltaic cells and/or a heat exchanger to generate electricity and to collect thermal energy. However, these known systems have a number of problems including: (1) low utilization factor since peak solar irradiance is available only for a short time each day, resulting in underutilization of the solar collector as well as the system which are generally designed for peak intensity; (2) inability to provide on-demand heat or electricity without storage which adds to system complexity, footprint, and costs and reduces overall efficiency; and (3) system capital costs per unit power generation. As such, there is a need for an improved solar collector that provides a greater utilization factor, provides on-demand heat or electricity and reduced system capital costs.

SUMMARY OF THE INVENTION

A general object of the invention is to provide a solar-infrared hybrid collector that addresses key problems with current solar technologies, such as high capital cost per unit power output, low utilization factor and low or no energy production when solar intensity drops or during the night. The invention is suitable for residential, commercial, industrial, and power generation customers as it allows significant increases in the utilization factor/throughput of concentrated photovoltaics (CPV) collectors and concentrated solar thermal (CST) collectors, also known as concentrated solar power (CSP). Benefits compared to current CPV and CST technologies include: two to three times higher annual output from the same size collector with no changes to balance of the plant; on-demand generation of heat and electricity without the need to store energy; reduced equipment footprint per unit energy output; and potentially significantly reduced costs per unit energy output.

In an embodiment of the invention, the solar-infrared hybrid collector includes a reflector with a receiver positioned in proximity to the reflector and configured to collect solar radiation and infrared radiation reflected off the reflector. The solar-infrared hybrid collector further includes an infrared heater, also known as an IR burner, positioned in proximity to the receiver and configured to provide infrared radiation to the receiver. The infrared heater may provide infrared radiation directly to the receiver or reflected off the reflector. In operation, the receiver converts solar radiation and infrared radiation into electricity or collects thermal energy. In a preferred embodiment, the infrared heater is activated when a demand for energy is greater than an energy provided by the sun. With this design, the system footprint of the solar-infrared hybrid collector is not increased over the size of conventional solar collectors.

In a preferred embodiment, the receiver includes a photovoltaic (PV) cell to convert solar radiation and infrared radiation into electricity. For ease of explanation, the following description will refer to photovoltaic (PV) cells but it should be understood that concentrated photovoltaics are also contemplated. The receiver preferably further includes a heat exchanger device for absorbing solar radiation and infrared radiation in a heat transfer medium thereby raising a temperature of the heat transfer medium for use in heating, cooling, power generation or other similar purposes.

The reflector of this invention may comprise one of a variety of shapes including, for example, a substantially parabolic dish, a substantially parabolic trough, a compound parabolic dish, a compound parabolic trough, a planar mirror and a plurality of mirror segments forming a curved and/or angled shape. The reflector is preferably coated on an incident side to maximize reflection of solar radiation and infrared radiation and to minimize absorption of solar radiation and infrared radiation. When using the substantially parabolic dish, the receiver is preferably located proximate to a focal point of the substantially parabolic dish. When using the substantially parabolic trough, the receiver is preferably located proximate to an axis of the substantially parabolic trough. When using the compound parabolic dish, the receiver is preferably located in proximity to dual focal points of the compound parabolic dish. When using the compound parabolic trough, the receiver is preferably located in proximity to dual axis of the compound parabolic trough. In an alternative embodiment, the reflector may instead comprise a focusing lens, such as a Fresnel lens, to focus solar radiation on the receiver. In an embodiment of this invention, the reflector may include a heat exchanger or heat sink to prevent the reflector from overheating.

In operation, during times of peak solar intensity, a majority of incident solar energy is reflected by the reflector towards the receiver which preferably converts a significant portion of it to electricity and a remaining portion of the solar energy is reflected or absorbed to generate thermal energy. When a demand for energy is greater than the solar-infrared hybrid collector can generate from solar energy alone, the infrared heater including a focusing reflector is activated to provide infrared radiation to the receiver to increase a collector output. Preferably, the infrared heater includes a reflector to direct nearly all radiation energy from the infrared heater towards the receiver for production of electricity and thermal energy.

With this design, the solar-infrared hybrid collector provides significant improvement over conventional solar collectors. Even in relatively sunny locations like California, an average annual irradiance is only 22% of peak irradiance, the solar-hybrid collector of this invention maximizes utilization of the collector and increases an annual collector energy output by two to three times without significant changes to the plant.

BRIEF DESCRIPTION OF THE DRAWINGS

These and other objects and features of this invention will be better understood from the following detailed description taken in conjunction with the drawings, wherein:

FIG. 4 is a schematic drawing of a solar-infrared hybrid collector according to another embodiment of this invention.

FIG. 5d is a schematic drawing of an infrared heater according to an embodiment of this invention.

DESCRIPTION OF PREFERRED EMBODIMENTS

The present invention provides an improved solar collector including an infrared heater to provide thermal and electric output during times of low or no solar intensity.

Figure 1:
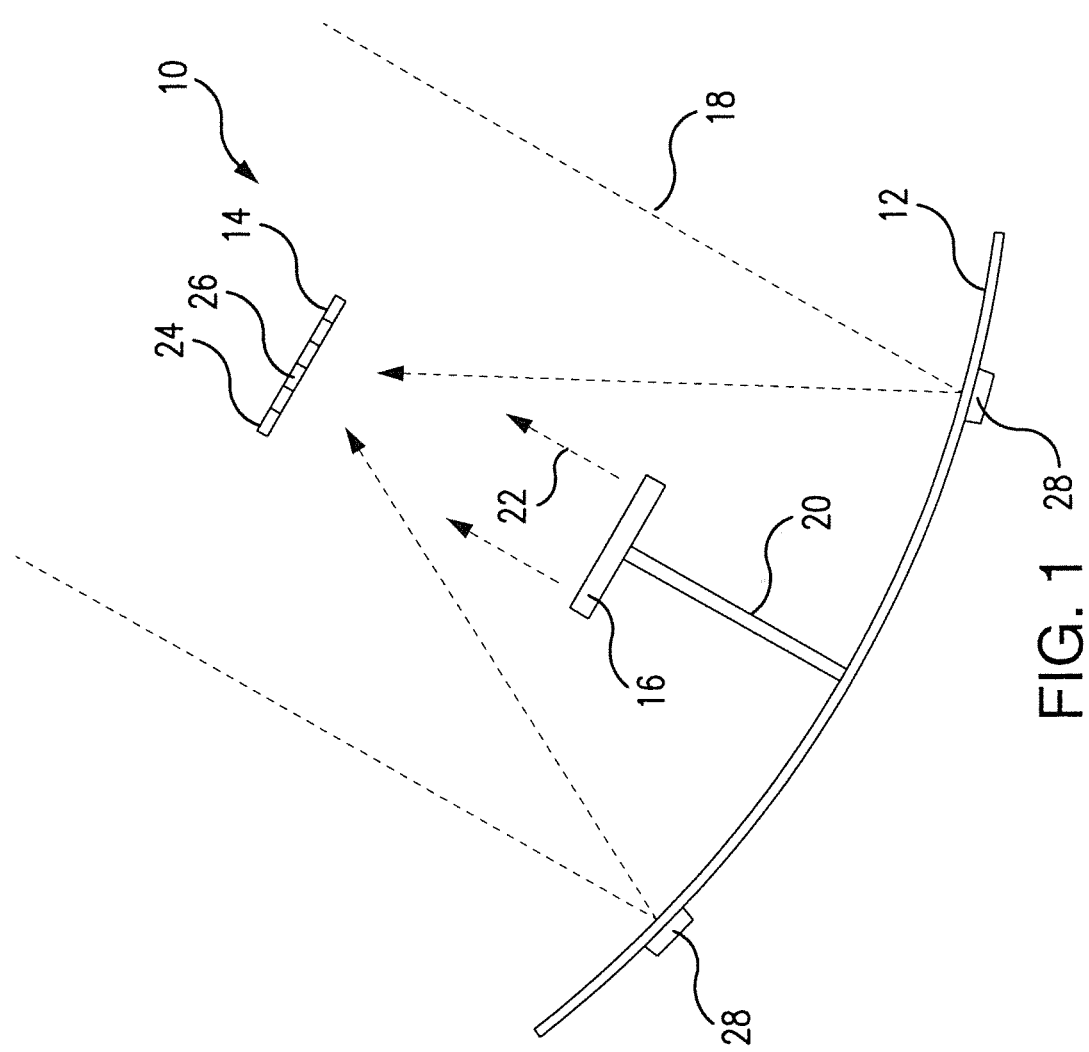
FIG. 1 is a schematic drawing of a solar-infrared hybrid collector according to an embodiment of this invention.
Figure 2:
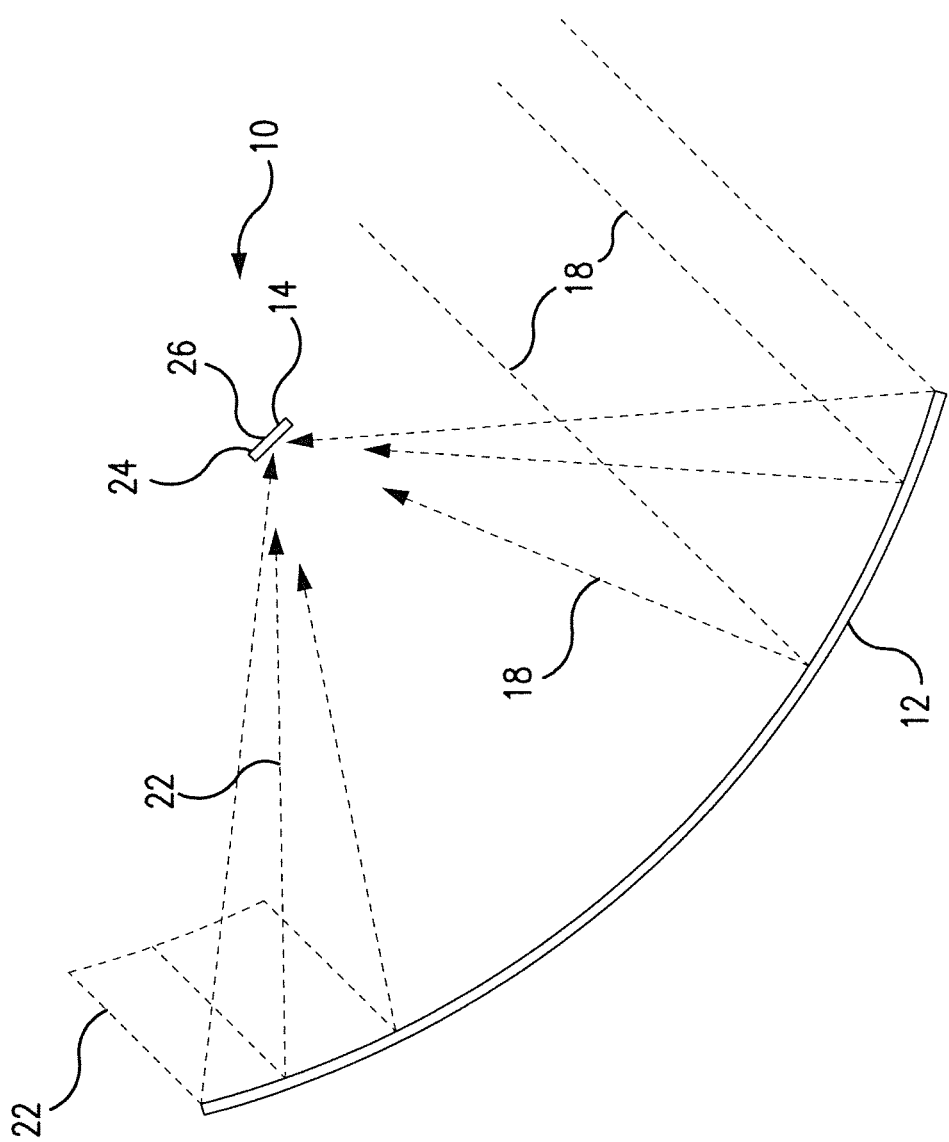
FIG. 2 is a schematic drawing of a solar-infrared hybrid collector according to another embodiment of this invention.
Figure 3:
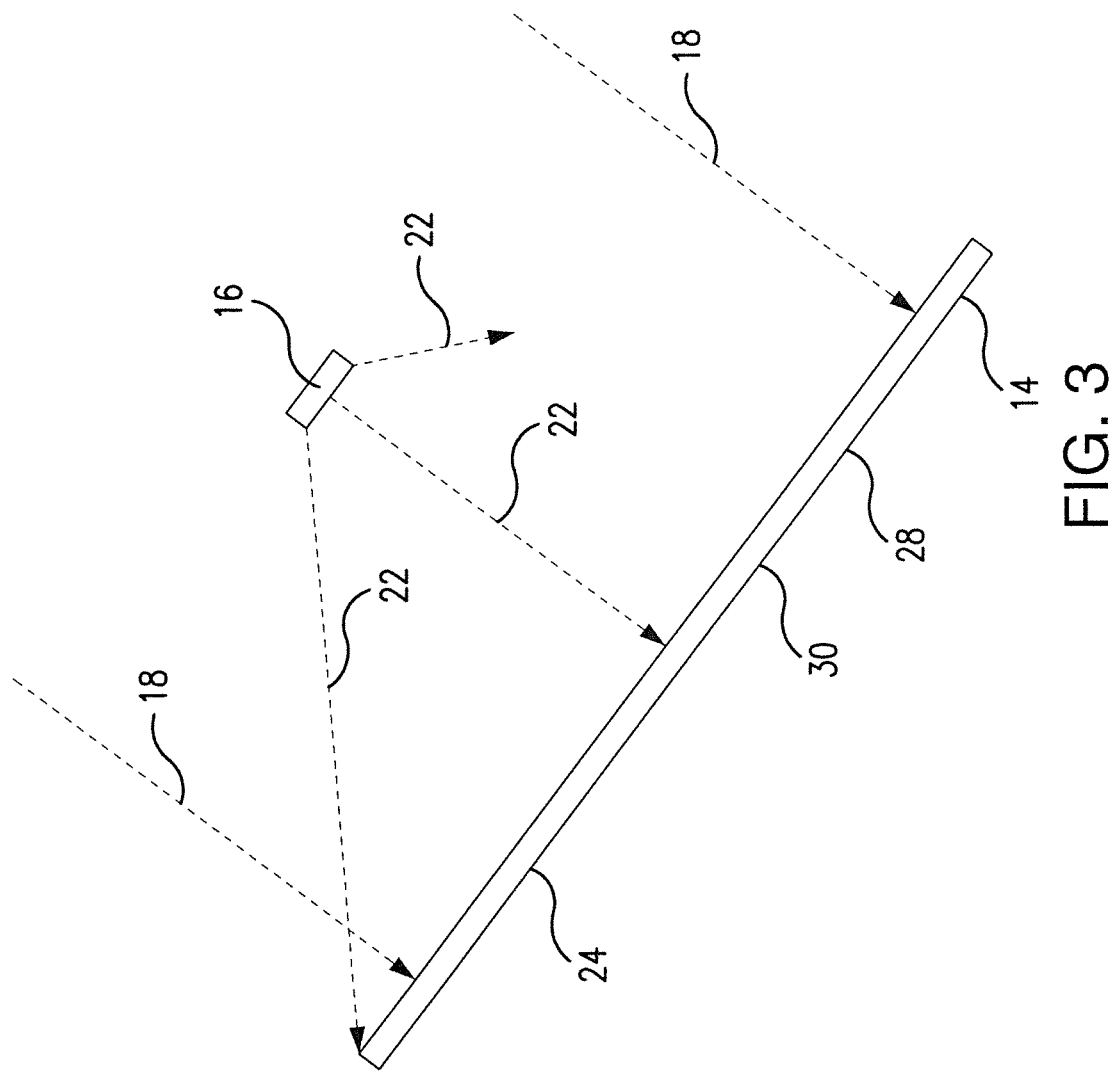
FIG. 3 is a schematic drawing of a solar-infrared hybrid collector according to another embodiment of this invention.

FIG. 1 shows a solar-infrared hybrid collector 10 according to an embodiment of this invention. In this embodiment, the solar-infrared hybrid collector includes a reflector 12, a receiver 14 and an infrared heater 16, also known as an IR burner. As shown in FIG. 1, the reflector 12 is positioned in proximity to the receiver 14 to reflect solar radiation 18 from the sun to the receiver 14 and the infrared heater 16 is positioned on a mounting mechanism to project infrared radiation 22 directly to the receiver 14. In another embodiment, as shown in FIG. 2, the infrared heater 16 is positioned to shine infrared radiation 22 off the reflector 12 to the receiver 14. In another embodiment of this invention, as shown in FIG. 3, the solar-infrared hybrid collector 10 may not include a reflector. In this embodiment, solar radiation and infrared radiation are received by a substantially flat receiver 30 including PV cells and a heat exchanger to generate electricity and capture thermal energy. In another embodiment of this invention, as shown in FIG. 4, the solar-infrared hybrid collector 10 may not include a reflector and solar radiation and infrared radiation are received by a curved receiver 32 including PV cells and a heat exchanger to generate electricity and capture thermal energy. The curved receiver 32 may be used to improve energy capture. In embodiments of this invention without a reflector, such as shown in FIGS. 3 and 4, the infrared heater 16 is designed to maximize coverage of the PV cells, while minimizing stray radiation, with the generated infrared energy. Use of a reflector or other optical device may be used to improve energy capture.

In an embodiment of this invention, the reflector 12 is a substantially parabolic dish with a mirror finish with the receiver 14 positioned in proximity to a focal point of the parabolic dish or positioned in proximity to an axis of the parabolic dish. In another embodiment, the reflector may comprise a substantially compound parabolic dish or trough, with the receiver 14 located proximate or in between a dual axes of the compound parabolic dish or trough. In other embodiments, the reflector 12 may comprise other shapes to capture, concentrate and/or direct solar radiation and infrared radiation towards the receiver 14 for producing useful thermal energy and electricity. In another alternative embodiment, the reflector may be replaced or enhanced with a lens to focus energy from the sun and/or the infrared heater 16 to the receiver 14.

Preferably, the reflector 12 is coated on an incident radiation side to maximize reflection of solar radiation and/or infrared radiation and to minimize absorption of solar radiation and infrared radiation. Maximizing reflection improves the energy efficiency and reduces a level of cooling required for the reflector 12. In a preferred embodiment, the reflector 12 further includes a reflector heat exchanger 28 to cool the reflector 12 using a suitable heat exchanger mechanism. The reflector heat exchanger 28 may cool the entire reflector 12, alternatively, the reflector heat exchanger 28 may be selectively positioned at hot spots along the reflector 12. The reflector heat exchanger 28 maintains integrity of the reflector 12 at high temperatures and may also be used to capture the thermal energy. In another embodiment, the reflector heat exchanger may be replaced with a heat sink.

In the embodiment of FIG. 1, the infrared heater 16 is mounted to the reflector 12 with a pedestal 20 and positioned to allow the infrared heater 16 to emit infrared radiation 22 to the receiver 14. In a preferred embodiment, the infrared heater 16 may include a focusing reflector and/or a focusing lens to focus the infrared radiation 22 to the receiver 14.

In a preferred embodiment of this invention, the receiver 14 includes a heat exchanger 26. In an embodiment of this invention, the receiver 14 comprises a tubular heat exchanger for absorbing a substantial portion of an incident radiation, including at least one of solar radiation 18 and infrared radiation 22, into a heat transfer medium thereby raising a temperature of the heat transfer medium. In an alternative embodiment, the heat exchanger may not be a tubular heat exchanger and may comprise any type of heat exchanger known to a person of skill in the art. In another embodiment, the heat exchanger may be replaced with a heat sink. In operation, the heat transfer medium can be used for heating, cooling power generation or other uses known to a person having skill in the art.

In a preferred embodiment of this invention, the receiver 14 includes photovoltaic (PV) cells 24. The PV cells 24 are positioned to receive the incident radiation, including at least one of solar radiation 18 and infrared radiation 22, directly, or off the reflector 12. The PV cells 24 convert at least a portion of an incident radiation energy into electricity, while absorbing some of the unconverted radiation generating heat. The solar photovoltaic (PV) cells of this invention are made with suitable materials converting radiation into electricity, including, for example, compounds based on gallium and indium, such as Gallium arsenide (GaAs), gallium antimonide (GaSb), indium gallium arsenide antimonide (InGaAsSb), indium gallium arsenide (InGaAs), indium gallium phosphide (InGaP), and indium phosphide arsenide antimonide (InPAsSb). In a preferred embodiment, the photovoltaic (PV) cells are selected to be sensitive to both higher temperature solar radiation as well as the much lower temperature infrared radiation. In an embodiment of this invention, the receiver may include two or more different types of PV materials matched to solar radiation and infrared radiation to maximize electricity production. In another embodiment, a complex PV surface, designed through radiation ray tracing, is used to increase capture of both solar and infrared radiation.

The PV cells 24 are preferably glued to a backing structure of the receiver 14 to maximize contact and provide for effective heat removal and cooling. The glue is preferably able to withstand elevated temperatures and maximize adhesion and heat transfer. Alternatively, the PV cells 24 may be attached by any other means known by a person of skill in the art.

In a preferred embodiment, the heat exchanger 26 is positioned in proximity to the PV cells 24 to keep the PV cells 24 relatively cool, within a maximum operating temperature limit of the PV cells 24 and a means of attaching the PV cells to the heat exchanger. Preferably, the heat exchanger 26 protects the PV cells while also capturing heat for other uses. In an embodiment of this invention, the heat exchanger 26 cools the receiver 14 using a suitable heat exchanger mechanism with a heat transfer medium affixed to the PV cells to maintain the integrity of the PV cells and/or to capture the thermal energy in the heat transfer medium. The heat transfer medium may comprise, for example but not limited to, Therminol, a glycol water solution, a particle/gas mixture, and molten salts. The heat exchanger is preferably incorporated in the receiver 14, preferably behind the PV cells through which heat transfer medium flows to effectively remove and capture the heat from absorbed radiation that is not converted to electricity and also to maintain the receiver at a temperature acceptable for the integrity of the receiver and/or solar cell materials.

In an embodiment of this invention, the solar-infrared hybrid collector 10 may include a solar tracker to orientate the collector 10 towards the sun to maximize solar energy capture.

In operation, during times of peak incident solar energy (for example, early afternoon), the majority of incident solar energy is reflected by the reflector 12 towards the receiver 14. The PV cells 24 incorporated in the receiver 14 convert a portion of the incident solar energy into electricity while another portion of the remaining energy is absorbed into the heat exchanger 26 of the receiver 14. When the demand for energy is greater than the collector 10 can generate from solar energy alone, for example in morning, evening, night, during inclement weather or even during peak solar intensities, the infrared heater 16 is activated to increase the collector 10 output. A portion, generally over 50%, of radiation energy from the infrared heater 16 is reflected by the reflector 12 towards the receiver 14. The PV cells 24 incorporated in the receiver 14 convert a portion of the incident energy into electricity while another portion of the remaining energy is absorbed into the heat exchanger 26 of the receiver 14. When the solar-infrared hybrid collector 10 is not used to generate electricity, the incident energy is converted into heat. The infrared heater 16 provides on-demand electricity and/or thermal energy twenty-four hours a day and 365 days a year, regardless of a level of incident solar energy.

In another operation, the solar-infrared hybrid collector 10 of this invention may be used for thermal energy generation only and without PV cells for generating electricity. In this embodiment, the receiver 14 preferably comprises a tube through which the heat transfer medium passes. For example, the receiver may comprise a heat exchanger with a ½ inch to 1½ inch diameter tube and the heat transfer medium. Where the heat transfer medium may include, for example, Therminol, glycol water solution, particle/gas mixture, molten salts, and eutectic metals, to capture radiation energy including solar radiation and/or infrared radiation. Alternatively, the heat exchanger 26 of the receiver 14 may comprise any type of heat exchanger known to a person having skill in the art. Depending on the heat transfer material, the tube of the heat exchanger 26 may comprise a opaque material, for example copper or a transparent material, for example quartz, depending on the heat transfer medium's ability to directly absorb radiation. In a preferred embodiment, the tube of the heat exchanger 26 may be coated by a suitable material to maximize incident energy capture and minimize its reflection. In a preferred embodiment, the heat exchanger 26 is preferably enclosed or partially enclosed in a vacuum glass tube to minimize heat loss.

FIGS. 5a-d illustrate several embodiments of the infrared heaters 16 used in the solar-infrared hybrid collector of this invention. The infrared heater 16 of this invention preferably includes a fuel line 34 to provide a fuel to the infrared heater. The fuel is preferably a gaseous or vaporized liquid fuel, such as, for example, natural gas, other hydrocarbons, alcohol, synthetic gas, hydrogen, carbon monoxide, vaporized fuel oil, biofuel or a combination of such fuels. The fuel may further include an oxidant, for example, air, oxygen or another gas containing oxygen. The fuel and the oxidant may be premixed or provided separately to the infrared heater by an oxidant plenum. The infrared heater 16 burns the fuel, with or without additional oxidant, at a surface 36 of the infrared heater and converts a substantial portion of a heat released into radiant energy, including infrared radiation 22. The surface 36 of the infrared heater 16 may be selected from a variety of infrared surfaces known to one of skill in the art including, but not limited to, ported ceramic, porous ceramic, ceramic/metal/composite foam surfaces. The surface may be selected to provide higher and/or uniform temperatures and to achieve desired radiation characteristics to maximize radiation capture and minimize losses. In a preferred embodiment, a coating may be applied to a radiant surface to achieve desired radiant energy characteristics, such as wavelengths that maximize conversion to electricity. The surface may also comprise a catalyzed surface that promotes combustion. In a preferred embodiment, the burner in the infrared heater 16 may include a recovery means, e.g. recuperator or regenerator, for capturing and recycling exhaust heat as thermal, e.g. through air and/or fuel preheating, and/or chemical, e.g. fuel reforming, energy to increase the infrared heater's overall thermal efficiency and maximize conversion of heat released to radiant energy.

Figure 5A:
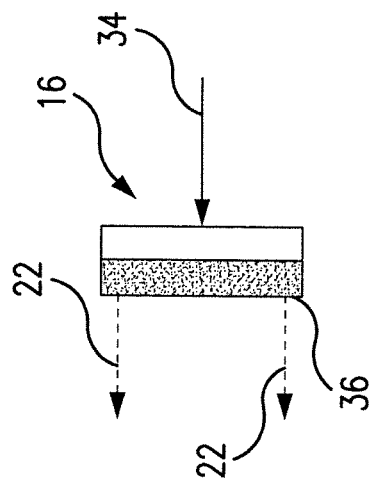
FIG. 5a is a schematic drawing of an infrared heater according to an embodiment of this invention.

In an embodiment of this invention, as shown in FIG. 5a, the infrared heater 16 comprises a radiant flat surface. In another embodiment, as shown in FIG. 5b, the infrared heater 16 includes an infrared radiation reflector 38 to reflect the radiant energy from the flat radiant surface. The infrared radiation reflector 38 preferably comprises a metal or a metal alloy and coated with a reflective coating on the inside to maximize reflection of incident infrared energy.

Figure 5C:
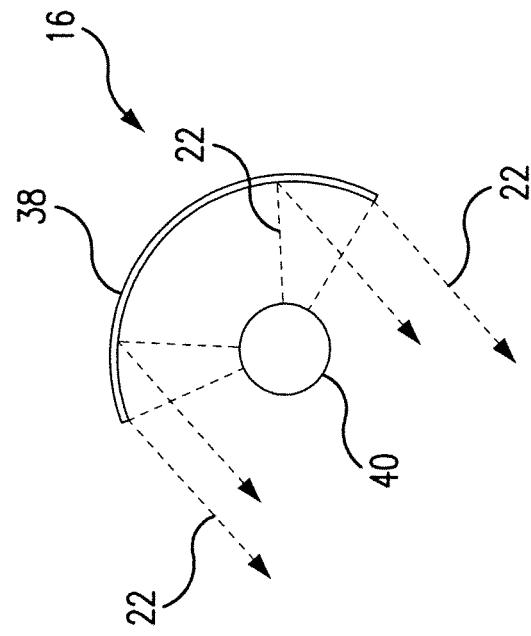
FIG. 5c is a schematic drawing of an infrared heater according to an embodiment of this invention.
Figure 5B:
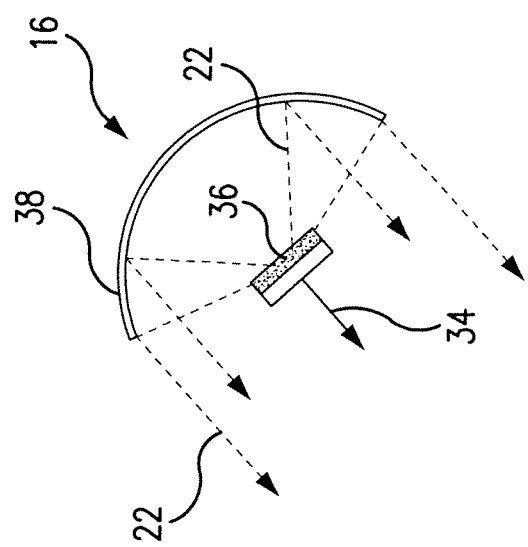
FIG. 5b is a schematic drawing of an infrared heater according to an embodiment of this invention.

In another embodiment, as shown in FIG. 5c, the infrared heater 16 includes a radiant tube 40. Preferably, the radiant tube 40 comprises a substantially non-porous radiant tube. The radiant tube 40 is preferably positioned in proximity to an axis of the infrared radiation reflector 38 to maximize the infrared radiation projected to the receiver 14 to generate electricity and/or thermal energy. The radiant tube 40 may comprise various material depending on a desired infrared profile including, but not limited to, metal, ceramic or composites. In a preferred embodiment, the tube 40 includes a diameter ranging from 2" to 8" however other diameters may be selected. The infrared radiation reflector 38 preferably comprises a metal or a metal alloy and coated with a reflective coating on the inside to maximize reflection of incident infrared energy. The radiant tube 40 may be designed with a burner and an exhaust located on the same side. Alternatively, the radiant tube 40 may be a straight through design with the burner and the exhaust located on opposite sides. The tube may use surface enhancements or inserts to enhance combustion, heat transfer and/or radiation characteristics.

In another embodiment of the infrared heater, as shown in FIG. 5d, the infrared heater 16 includes a tube 40 and an infrared radiation reflector 38. The tube 40 preferably comprises a metallic, composite or ceramic tube with integrated heat recovery to increase radiant output and thermal efficiency. The reflector 38 provides focused radiant energy from the infrared heater 16. In a preferred embodiment, the infrared heater 16 includes a lens 42 to protect the burner from the elements and/or to control the radiant energy direction and focus. In an embodiment, the lens 42 may comprise a quartz sheet. A space enclosed by the reflector 38 and the lens 42 is preferably evacuated to minimize convective and conductive heat losses.

In an embodiment of this invention, the infrared heater 16 incorporates low NOx combustion techniques to minimize NOx generation and for emissions compliance.

In an embodiment the solar-infrared hybrid collector 10 includes a plurality of infrared heaters 16 placed in a generally symmetrical arrangement with respect to the receiving surface. The plurality of infrared heaters may comprise the same or different designs.

In a preferred embodiment of this invention, the solar-infrared hybrid collector 10 includes a heat recovery means, e.g. recuperator or regenerator, for capturing and recycling exhaust heat as thermal, e.g. through air and/or fuel preheating, and/or chemical, e.g. fuel reforming, energy to increase its overall thermal efficiency and maximize conversion of heat released to radiant energy, and also allow an increase in its temperature which is desirable for maximizing conversion of infrared energy to electricity by the PV cells. In an embodiment of this invention, a regenerative burner may be located on both ends of the radiant tube 40 and reversed periodically, for example every 10 to 30 seconds, to maximize heat recovery, increase tube 40 temperature and consequently its radiant flux uniformity.

The disclosed solar-infrared hybrid collector concept provides on demand thermal energy and or electricity output 24 hours a day, 365 days a year, and enables substantially greater utilization time of the collector. This reduces its footprint per unit energy output and also potentially reduces costs per unit energy output. It also minimizes the need for electricity and/or thermal energy storage further reducing the footprint and potentially the costs per unit energy output.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A solar-infrared hybrid collector comprising:
   a reflector;
   a photovoltaic receiver positioned in proximity to the reflector, the photovoltaic receiver having one surface configured to collect solar radiation from the sun via the reflector and infrared radiation from a fuel-fired infrared heater source;
   the fuel-fired infrared heater source positioned in proximity to the photovoltaic receiver and configured to provide infrared radiation directly to the one surface of the photovoltaic receiver configured to collect solar radiation from the sun via the reflector and infrared radiation from the fuel-fired infrared heater source;
   wherein the photovoltaic receiver converts solar radiation and infrared radiation from the fuel-fired infrared heater source into at least one of electricity and thermal energy, and
   wherein the fuel-fired infrared heater is activated when a demand for energy is greater than an energy provided by the sun.

2. The solar-infrared hybrid collector of claim 1, wherein the photovoltaic receiver further comprises a photovoltaic (PV) cell to convert the solar radiation and infrared radiation from the fuel-fired infrared heater source into electricity.

3. The solar-infrared hybrid collector of claim 2 wherein the photovoltaic (PV) cell comprises at least one of gallium and indium.

4. The solar-infrared hybrid collector of claim 1, wherein the photovoltaic receiver further comprises a heat exchanger device for absorbing, in a heat transfer medium, solar radiation from the sun and infrared radiation from the fuel-fired infrared heater source.

5. The solar-infrared hybrid collector of claim 1, wherein the photovoltaic receiver comprises a photovoltaic (PV) cell and a heat exchanger mechanism, wherein the photovoltaic (PV) cell converts solar radiation from the sun and infrared radiation from the infrared heater into electricity and the heat exchanger mechanism cools the photovoltaic (PV) cell.

6. The solar-infrared hybrid collector of claim 1, wherein the reflector comprises a substantially parabolic dish and the photovoltaic receiver is located proximate to a focal point of the substantially parabolic dish.

7. The solar-infrared hybrid collector of claim 1, wherein the reflector comprises a substantially parabolic trough and the photovoltaic receiver is located proximate to an axis of the substantially parabolic trough.

8. The solar-infrared hybrid collector of claim 1, wherein the reflector comprises a compound parabolic dish and the photovoltaic receiver is located in proximity to dual focal points of the compound parabolic dish.

9. The solar-infrared hybrid collector of claim 1, wherein the reflector comprises a compound parabolic trough and the photovoltaic receiver is located in proximity to dual axes of the compound parabolic trough.

10. The solar-infrared hybrid collector of claim 1, wherein the reflector is coated on an incident side to maximize reflection of solar radiation from the sun and infrared radiation from the fuel-fired infrared heater source and to minimize absorption of solar radiation from the sun and infrared radiation from the fuel-fired infrared heater.

11. The solar-infrared hybrid collector of claim 1, wherein the reflector includes a heat exchanger.

12. A method of using the solar-infrared hybrid collector of claim 1, wherein when a demand for energy is greater than provided by the sun, the infrared heater source is activated.

13. The solar-infrared hybrid collector of claim 1, wherein the fuel-fired infrared heater source includes a focusing reflector and a lens.

14. The solar-infrared hybrid collector of claim 1 wherein the solar radiation and the infrared radiation are delivered at different angles to the receiver.

15. A solar-infrared hybrid collector comprising:
   a reflector;
   a photovoltaic receiver including a heat exchanger with a heat transfer medium, the photovoltaic receiver positioned in proximity to the reflector and having one surface configured to collect solar radiation via the reflector and infrared radiation from a fuel-fired infrared heater source;

the fuel-fired infrared heater source including a fuel, wherein the fuel is burned to convert the fuel into radiant energy to provide infrared radiation directly to the one surface of the photovoltaic receiver configured to collect solar radiation via the reflector and infrared radiation from the fuel-fired infrared heater source;

wherein the photovoltaic receiver converts solar radiation and infrared radiation from the fuel-fired infrared heater source into thermal energy; and wherein the fuel-fired infrared heater source is activated when a demand for energy is greater than an energy provided by the sun.

16. The solar-infrared hybrid collector of claim 15, wherein the photovoltaic receiver further includes a photovoltaic (PV) cell to convert the solar radiation and infrared radiation from the fuel-fired infrared heater source to electricity.

17. The solar-infrared hybrid collector of claim 15, wherein the receiver includes a tube through which the heat transfer medium passes.

18. The solar-infrared hybrid collector of claim 15, wherein the heat transfer medium comprises at least one of Therminol, a glycol water solution, a particle/gas mixture, molten salts and eutectic metals.

19. The solar-infrared hybrid collector of claim 15, wherein at least a portion of the receiver is enclosed in a vacuum glass tube to minimize heat loss.

20. The solar-infrared hybrid collector of claim 15, wherein the fuel comprises at least one of natural gas, synthetic gas, hydrogen, carbon monoxide, vaporized fuel oil, and biofuel.

21. The solar-infrared hybrid collector of claim 15, wherein the infrared heater includes a coating applied to a radiant surface to provide a desired radiant energy characteristics.

22. The solar-infrared hybrid collector of claim 15, wherein the infrared heater includes a catalyst to promote combustion.

23. The solar-infrared hybrid collector of claim 15, wherein the infrared heater includes a heat recovery means for capturing and recycling an exhaust heat as one of a thermal energy and a chemical energy.

24. A solar-infrared hybrid collector comprising:

a reflector;

a photovoltaic receiver positioned in proximity to the reflector; and a fuel-fired infrared heater source positioned in proximity to the photovoltaic receiver;

wherein the photovoltaic receiver has a single surface configured to collect solar radiation from the sun via the reflector as well as infrared radiation directly from the fuel-fired infrared heater source;

wherein the photovoltaic receiver converts collected solar radiation and infrared radiation into at least one of electricity and thermal energy, and wherein the fuel-fired infrared heater is activated when a demand for energy is greater than energy the collector can generate from the collected solar radiation alone.

* * * * *